United States Patent
Azuma et al.

(10) Patent No.: US 7,610,355 B2
(45) Date of Patent: Oct. 27, 2009

(54) TRANSFERRING WEB CONTENTS

(75) Inventors: Shigeo Azuma, Yokohama (JP); Takashi Takahashi, Tokyo (JP); Toshifumi Takahashi, Hamamatsu (JP)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 11/832,681

(22) Filed: Aug. 2, 2007

(65) Prior Publication Data

US 2008/0040448 A1 Feb. 14, 2008

(30) Foreign Application Priority Data

Aug. 11, 2006 (JP) .............................. 2006-220420

(51) Int. Cl.
*G06F 15/16* (2006.01)
(52) U.S. Cl. ..................................... 709/217
(58) Field of Classification Search .................. 709/217
See application file for complete search history.

(56) References Cited

U.S. PATENT DOCUMENTS

| | | | | |
|---|---|---|---|---|
| 6,393,418 | B1 * | 5/2002 | Hikita et al. ................... | 707/7 |
| 6,651,141 | B2 * | 11/2003 | Adrangi ....................... | 711/118 |
| 7,539,976 | B1 * | 5/2009 | Ousterhout et al. .......... | 717/120 |
| 2006/0224620 | A1 * | 10/2006 | Silverman et al. ......... | 707/104.1 |

FOREIGN PATENT DOCUMENTS

| | | |
|---|---|---|
| JP | 03125239 | 5/1991 |
| JP | 2002-197019 | 12/2002 |
| JP | 2004-070618 | 3/2004 |
| JP | 2004157883 | 6/2004 |

* cited by examiner

*Primary Examiner*—Douglas B Blair
(74) *Attorney, Agent, or Firm*—Shimokai & Associates, P.C.; Rob Straight

(57) ABSTRACT

To transfer web contents to a web server from a computer through a network, a plurality of files composing the web contents are stored in the computer. A processor of the computer then detects files to be transferred from the plurality of files to create a transfer file list table. A transfer priority of the files to be transferred is determined by the processor on the basis of reference relation data of the files to be transferred which are designated in the transfer file list table and file format data of the plurality of files to create a transfer priority list table for the files to be transferred. The files to be transferred are transferred to the web server from a communication controller of the computer through the network by the processor in order of the transfer priority set in the transfer priority list table.

11 Claims, 11 Drawing Sheets

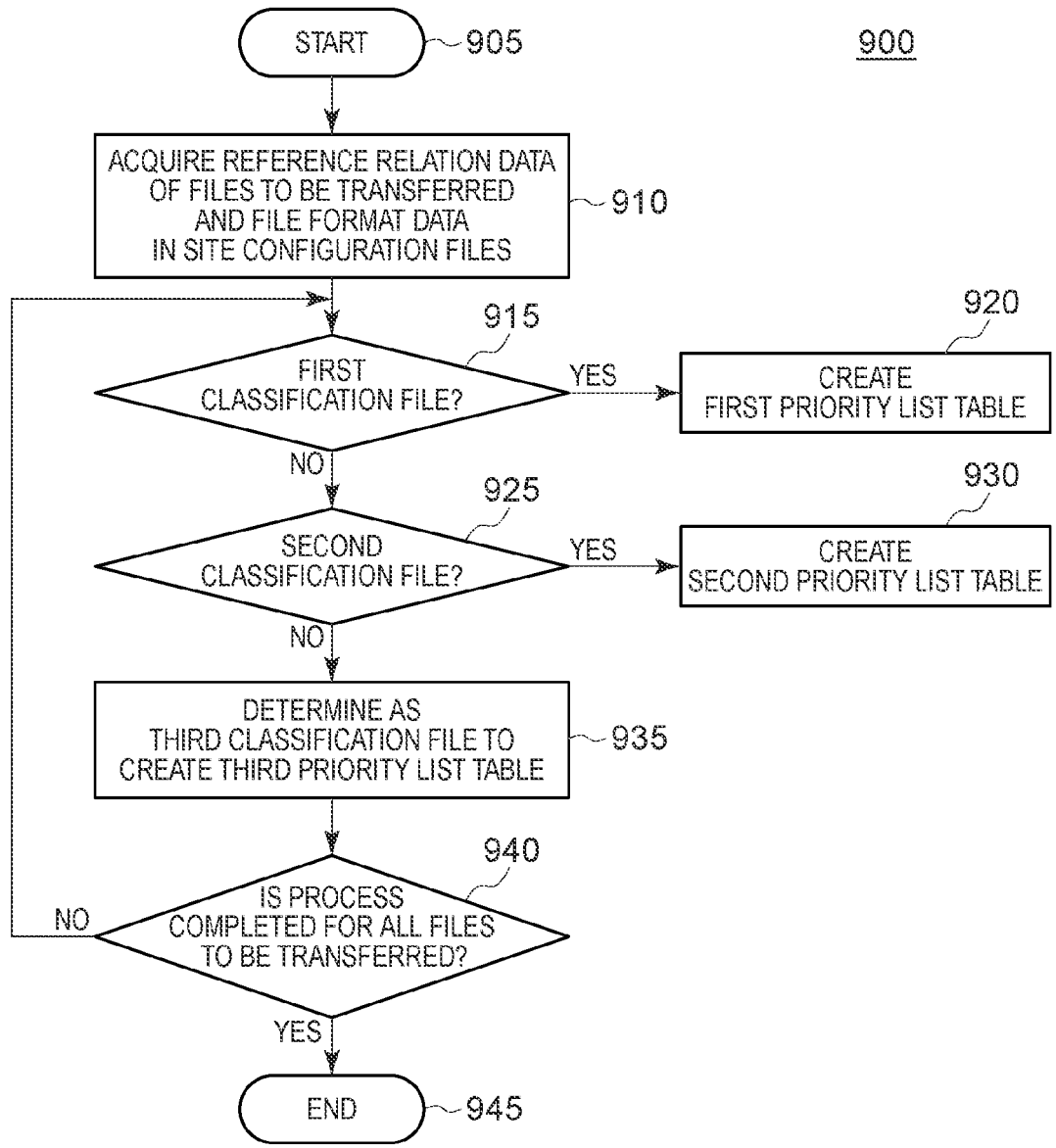

FIG. 11

1110 — FIRST PRIORITY LIST TABLE

| CONFIGURATION INFORMATION 5 |
|---|
| |
| |
| |

1120 — SECOND PRIORITY LIST TABLE

| HIGHER RANK LEVEL | LOWER RANK LEVEL |
|---|---|
| CONFIGURATION INFORMATION 4 | |
| | |
| | |

1130 — THIRD PRIORITY LIST TABLE

| CONFIGURATION INFORMATION 0 |
|---|
| CONFIGURATION INFORMATION 3 |
| |
| |

FIG. 12

550 — SITE FILE INFORMATION

| FILE ID | FILE NAME | TIME AND DATE OF CREATION AND UPDATE | TIME AND DATE OF LAST TRANSFER |
|---|---|---|---|
| 0 | index.htm | 2006/03/20 11:40:12 | 2006/03/20 11:38:01 |
| 1 | c.gif | 2006/03/20 11:25:10 | 2006/03/20 11:38:03 |
| 2 | hpb9tm10_1.css | 2006/03/20 11:25:14 | 2006/03/20 11:38:12 |
| 3 | page1.html | 2006/03/20 11:40:20 | 2006/03/20 11:38:13 |
| 4 | addpage.html | 2006/03/20 11:40:35 | 2006/03/24 08:33:45 |
| 5 | bdg0001.jpg | 2006/03/20 11:40:32 | 2006/03/24 08:33:08 |

TRANSFERRING WEB CONTENTS

FIELD OF THE INVENTION

The present invention relates to a technology for transferring web contents, and more particularly relates to a method for transferring the web contents to a web server through a network, a computer for achieving the method, and a computer program for achieving the method by the computer.

BACKGROUND

As network technology such as the Internet or the like has been developed and become widespread, a demand for creating a website has been rapidly increased. A website contains one or more web pages including a hyperlink, and each web page includes layout information based on text data, HTML (Hyper Text Markup Language), or XML (eXtensible Markup Language), embedded image, audio, moving picture, or the like. Such web data composing a website, namely web contents are provided as files.

Files of web contents are created by utilizing application software having a web page creation edit function in a local environment of a client terminal, for example, a personal computer or the like. Created files of the web contents are then transferred to a web server using a tool such as FTP (File Transfer Protocol) software, and are published on the Internet with predetermined domain names and IP addresses.

Transfer of files of web contents to a web server is performed by executing mirroring upload by, for example, FFFTP which is one of the FTP software and is widely used in a program of Windows (a registered trademark). In this file transfer, since the same configuration of folders and files as that of the local environment of client terminal is created in the web server, the change of the files or the like in the local environment can be reflected in the web server.

In file transfer by the FTP software, such as FFFTP or the like, since software for creating and editing a web page in a client terminal manages the memory of folders and files based on a physical directory structure thereof, the folders and the files are transferred sequentially in order of folder names and file names according to such a physical directory structure. The file transfer is performed without taking into consideration a reference relation between files, in particular. In addition, with web contents complicated and diversified, while the number of configuration files has increased, file transfer takes time, and therefore the reference relation between files by hyperlink or the like has also been increasingly complicated.

Usually, a web server only stores and operates web contents for a website, while update of web contents or the like is performed by a website creator side, and it is not performed by a web server to examine whether or not a link relation between files gets discontinued to deal with a problem. Hence, when files are transferred to a web server, anything bad is going to happen in the reference relation between files. That is, in the web server, a situation that the link relation between transfer files gets discontinued such that a file to be referred to has not been transferred yet, etc. may occur. For that reason, when there is an access to a website during file transfer, there occurs a problem that a failure such as an error is caused with a display of the web page. Due to this problem, although the web contents themselves have been completed, quality of the web contents is recognized to be inferior by a web user, resulting in decline of evaluation to the website.

SUMMARY

Therefore, it is an object of the present invention to achieve web contents transfer capable of solving the above-mentioned problem, and particularly, capable of transferring files to a web server without damaging the reference relation between files. An object of the present invention includes providing of a method for transferring web contents to a web server, a computer for achieving the method, and a computer program for achieving the method by the computer, which can achieve transfer of such web contents.

In the method of transferring web contents from a computer to a web server through a network according to the present invention, at least following steps will be performed. First, a plurality of files containing web contents are stored in a storage unit of a computer. Then, by a processor of the computer, files to be transferred are detected from such plurality of files, and thereby a transfer file list table for the files to be transferred is created. Additionally, by the processor, a transfer priority of the files to be transferred is determined on the basis of reference relation data of the files to be transferred which are designated in the transfer file list table and file format data of the plurality of files, and thereby a transfer priority list table for the files to be transferred is created. The files to be transferred are then transferred to the web server from a communication controller of the computer through the network by the processor in order of the transfer priority set in the transfer priority list table.

In the above-mentioned method according to the present invention, preferably, the determining the transfer priority on the basis of the reference relation data and the file format data, and creating the transfer priority list table for the files to be transferred may be performed as follows. First, it is determined whether or not the files to be transferred are first classification files which are only referred to and taken into other files on the basis of the file format data, and thereby a first priority list table for the files to be transferred, which have been determined to be first classification files, is created. Next, it is determined whether or not the files to be transferred which have not been determined to be the first classification files are second classification files which do not refer to a file, which do not refer to a file other than itself even if they refer to a file, or which refer to only the first classification file or an existing not-changed file on the basis of the reference relation data and the file format data, and thereby a second priority list table for the files to be transferred, which have been determined to be the second classification files, is created. Thereafter, the files to be transferred, which have not been determined to be the second classification files, are determined to be third classification files which are not to be classified into the first classification files nor the second classification files, and thereby a third priority list table for the files to be transferred is created.

Transfer of the files to be transferred to the web server in order of the transfer priority set in the transfer priority list table may be then performed as follows. First, the files to be transferred, which have been set in the first and second priority list tables, are transferred to the web server according to the transfer priority. Next, the reference relation data of the file is inspected, regarding the files to be transferred which have been set in the third priority list table, to determine whether or not one file to be transferred and set in the third priority list table refers to another file other than itself to be transferred and set in the third priority list table, and the status of the one file is reset from the third priority list table to the second priority list table to re-create the second and third priority list tables, when it is determined that such another file does not exist. Additionally, the one file to be transferred which has been reset in the second priority list table is transferred to the web server when it is determined that such another file does not exist. In addition, the determination of whether or not such another file exists, the re-creation of the second and third priority list tables, and the transfer of the files to the web server are repeated until the one file to be transferred disappears when it is determined that such another file does not exist. Thereafter, the remaining one file to be transferred is transferred to the web server in case the one file to be transferred and set in the third priority list table remains when it is determined that such another file exists.

In the above-mentioned method according to the present invention, a plurality of files composing web contents may be created and updated by other computer connected to the computer through the network, and the plurality of files may be received from the other computer to store the files in the storage unit.

A computer for providing web contents to a web server through a network according to the present invention includes a storage unit; a processor connected to the storage unit; a communication controller connected to the processor; a plurality of files composing the web contents stored in the storage unit; a transfer file list creating unit, executed by the processor, for detecting files to be transferred from the plurality of files, and thereby creating a transfer file list table for the files to be transferred; a transfer priority list creating unit, executed by the processor, for determining a transfer priority of the files to be transferred on the basis of reference relation data of the files to be transferred which are designated in the transfer file list table and file format data of the plurality of files, and thereby creating a transfer priority list table for the files to be transferred; and a file transfer unit, executed by the processor, for transferring the files to be transferred from the communication controller to the web server through the network in order of the transfer priority set in the transfer priority list table.

A computer program for achieving the above-mentioned method according to the present invention by a computer causes the computer connected to the web server through the network to execute at least followings. Namely, first it is executed to store a plurality of files composing web contents in a storage unit of the computer. Next it is executed by a processor of the computer to detect files to be transferred from the plurality of files, and thereby create a transfer file list table for the files to be transferred. Additionally, it is executed by the processor to determine a transfer priority of the file to be transferred on the basis of reference relation data of the files to be transferred which are designated in the transfer file list table and file format data of the plurality of files, and thereby create a transfer priority list table for the files to be transferred. Next, it is executed by the processor to transfer the files to be transferred from a communication controller of the computer to the web server through the network in order of the transfer priority set in the transfer priority list table. It is also possible to implement the computer program according to the present invention as a storage medium for storing the program.

According to the present invention, it is possible to achieve the situation that any reference relation between transfer files may be prevented from being damaged in the web server by setting the transfer priority of the files based on the reference relation between files and transferring the files in order of the set transfer priority. For that reason, the present invention solves a problem that a failure such as an error or the like, may occur in display of the web page due to the file transfer.

BRIEF DESCRIPTION OF THE DRAWINGS

The invention will now be described with reference to the drawings, wherein:

FIG. 8 is a view illustrating a transfer file list table 800;

FIG. 9 is a view illustrating a process performed by the CPU 201 in order to create a transfer priority list table;

FIG. 11 is a view illustrating one example of the transfer priority list table;

FIG. 12 is a view illustrating a site file information table 550 after file transfer;

DETAILED DESCRIPTION

Figure 1:
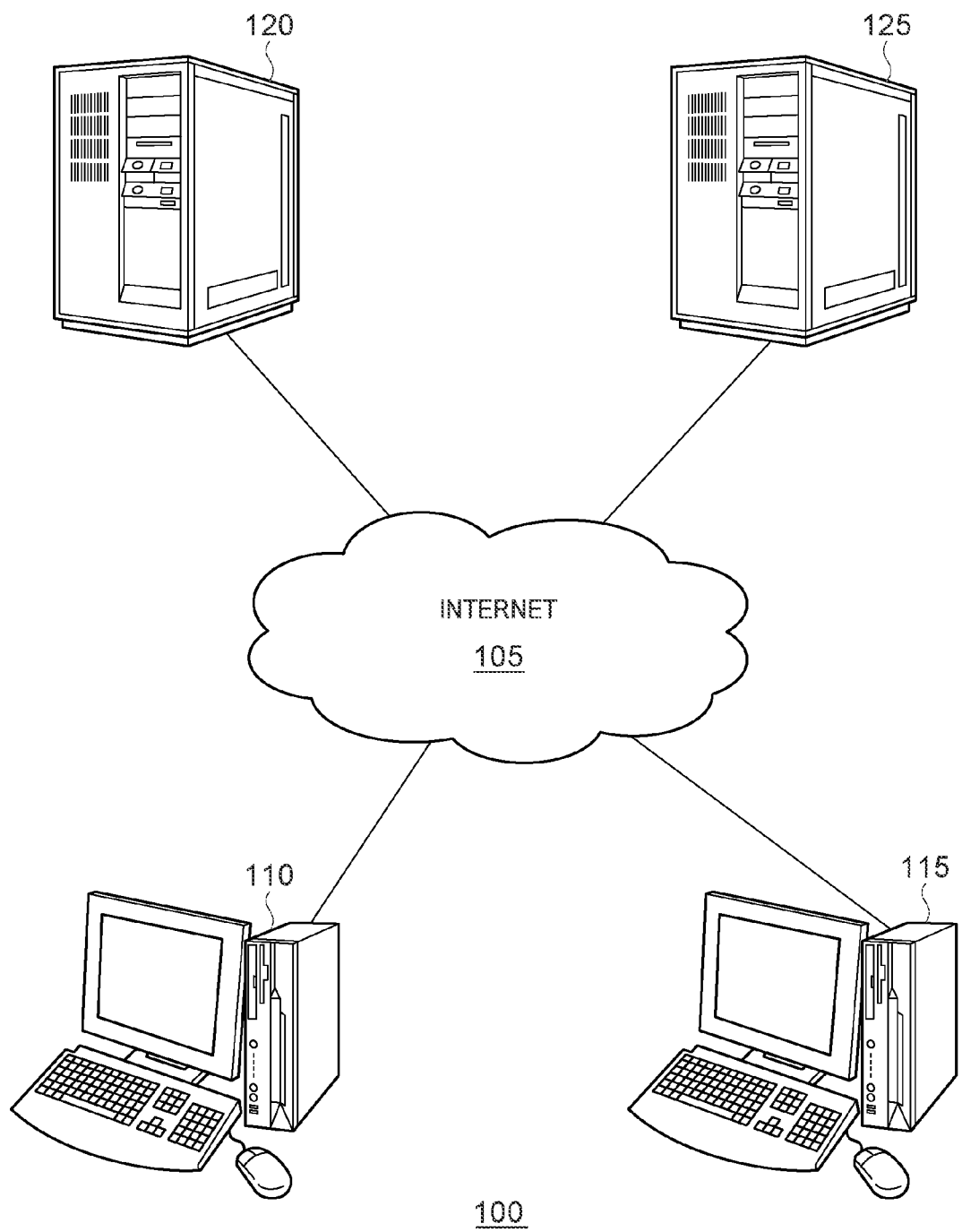
FIG. 1 is a view illustrating a schematic configuration of a client-server system to which a method, a computer, and a program for transferring web contents in accordance with one embodiment of the present invention are applied.

FIG. 1 is a view showing a schematic configuration of a client-server system 100 to which a method for transferring web contents in accordance with one embodiment of the present invention, and a computer and a computer program for achieving the method are applied. As shown in FIG. 1, this system is provided with an internet 105, computers 110 and 115 on the client side, and a web server 120 and a file server 125 on the server side, which are connected to the internet 105, respectively.

The computers 110 and 115 on the client side can be composed of a personal computer having a web browsing function, a web page creation edit function, an FTP function, or the like. These functions are achieved by web browser software, web page creation editing software, FTP software, or the like, respectively. In addition, a device driver and an operation system are installed, and any other application software may be installed. This point is the same as that of the after-mentioned web server 120 and file server 125.

The web server 120 can be composed of a personal computer or a workstation provided with a database of web contents. Software for web server is installed in the web server 120, and a function thereof makes it possible to transmit the web contents stored in the server or to start a CGI script in response to a request from a client.

The file server 125 can also be composed of a personal computer or a workstation provided with a database of web contents. However, unlike the web server 120, the file server 125 mainly performs keeping or storing data files of web contents.

Figure 2:
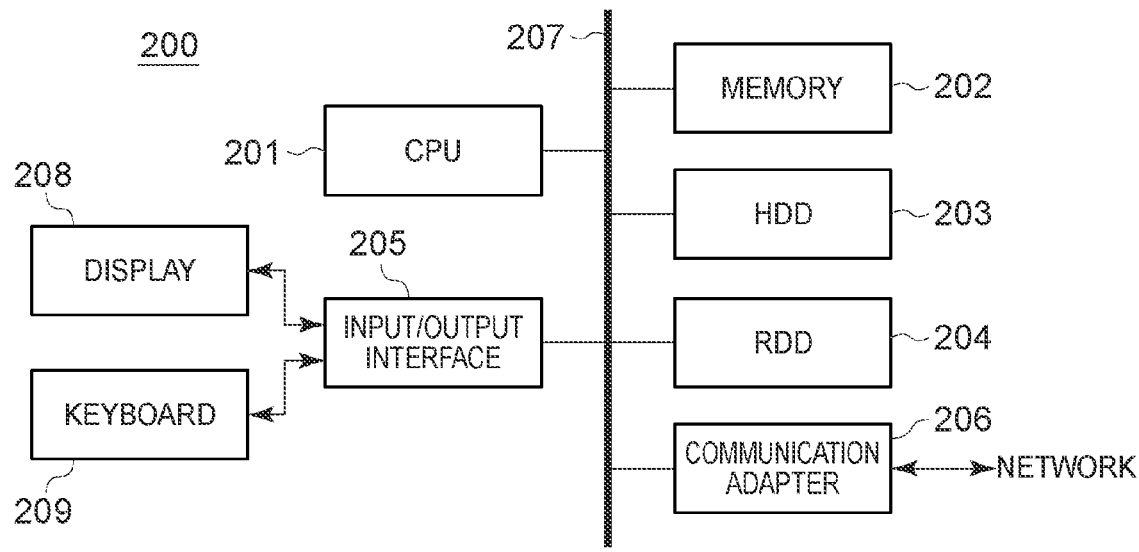
FIG. 2 is a schematic block diagram illustrating a hardware configuration of a computer 110.

FIG. 2 is a schematic block diagram showing a hardware configuration 200 of the computer 110. As shown in FIG. 2, the computer 110 is provided with a processor of a CPU 201, a storage unit of a memory 202, a hard disk drive (HDD) 203, and a removable disk drive (RDD) 204 capable of refreshing a record medium, such as a flexible disk, a CD-ROM, a CD-R, and a DVD-ROM, an input/output controller of an input/output interface 205, and a communication controller of a communication adapter 206 for connecting to a network, such as the internet 105, and has a configuration in which those are connected to each other through a bus 207. The computer 110 can be connected to a display unit of a display 208, an input device of a keyboard 209, or the like through the input/output interface 205, and is connected to the network through the communication adapter 206.

Each function of the computer 110 is achieved by various pieces of installed software being read from the HDD 203 into the memory 202 upon starting the computer or during executing the program, and the CPU 201 sequentially processing these.

Figure 3:
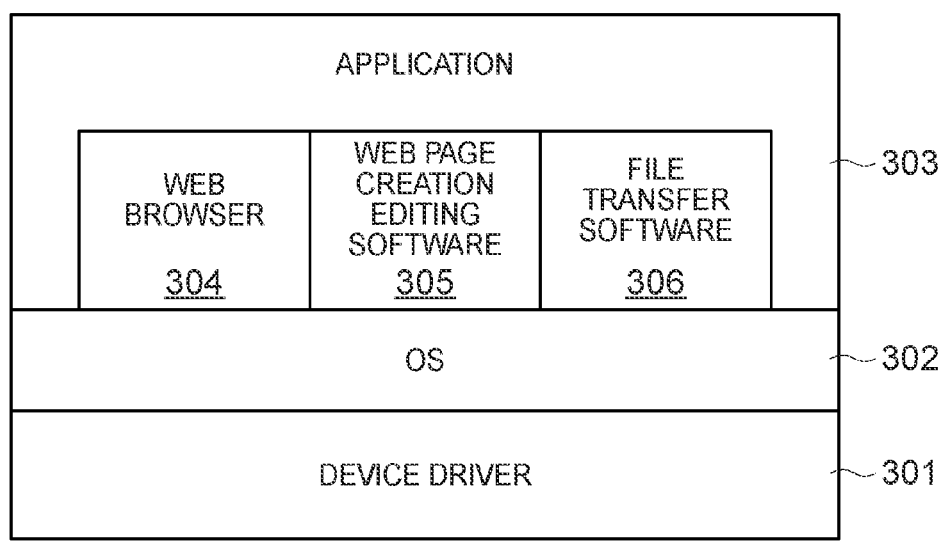
FIG. 3 is a view illustrating a software configuration of the computer 110.

FIG. 3 is a view showing a software configuration 300 of the computer 110. As shown in FIG. 3, the computer 110 is provided with a device driver 301, an operation system (OS) 302, and an application software 303. The application software 303 includes a web browser 304 for browsing a web page published by the web server 120, and a web page creation editing software 305 for creating and correcting the web page.

In addition to the web page creation editing software 305, file transfer software 306 for achieving functions of setting a transfer priority of the files on the basis of a reference relation between the files, and also, transferring the files to the web server 120 in order of the set transfer priority is provided by the present invention. The file transfer software 306 may be included in web page creation editing software as a part of it to be provided.

Meanwhile, when the file server 125 offers services to supply the data files of web contents to the web server 120 instead of the computer 110, the file transfer software 306 is provided to the file server 125 to function. In this case, a plurality of files composing the web contents are created and updated by other computers 110 and 115 connected to the file server 125 through the network. The file server 125 receives the plurality of files from other computers 110 and 115 to store it in its own storage unit.

The file transfer software 306 is read from the HDD 203 into the memory 202, and the CPU 201 executes a procedure mentioned below to transfer the files to the web server 120.

Figure 4:
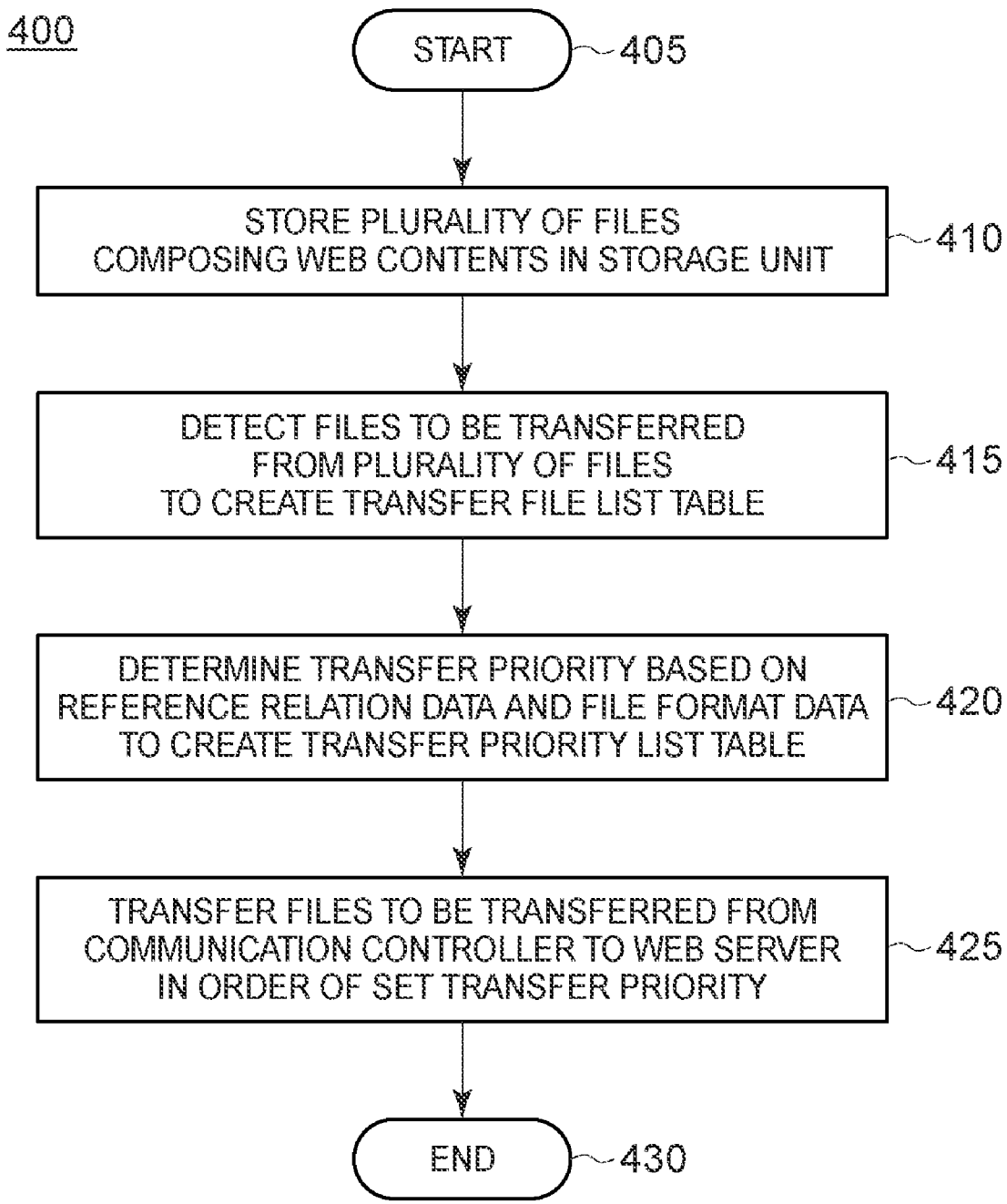
FIG. 4 is a view illustrating a flow chart 400 showing one embodiment of the method for transferring the web contents according to the present invention.

FIG. 4 illustrates a flow chart 400 showing one embodiment of the method according to the present invention for transferring the web contents to the web server. The process starts at Step 405. First, a plurality of files composing the web contents are stored in the HDD 203 which is the storage unit of the computer 110 (410). The files are stored on the basis of a site file management mechanism which can be provided, for example ☐ by the web page creation editing software.

Figure 5:
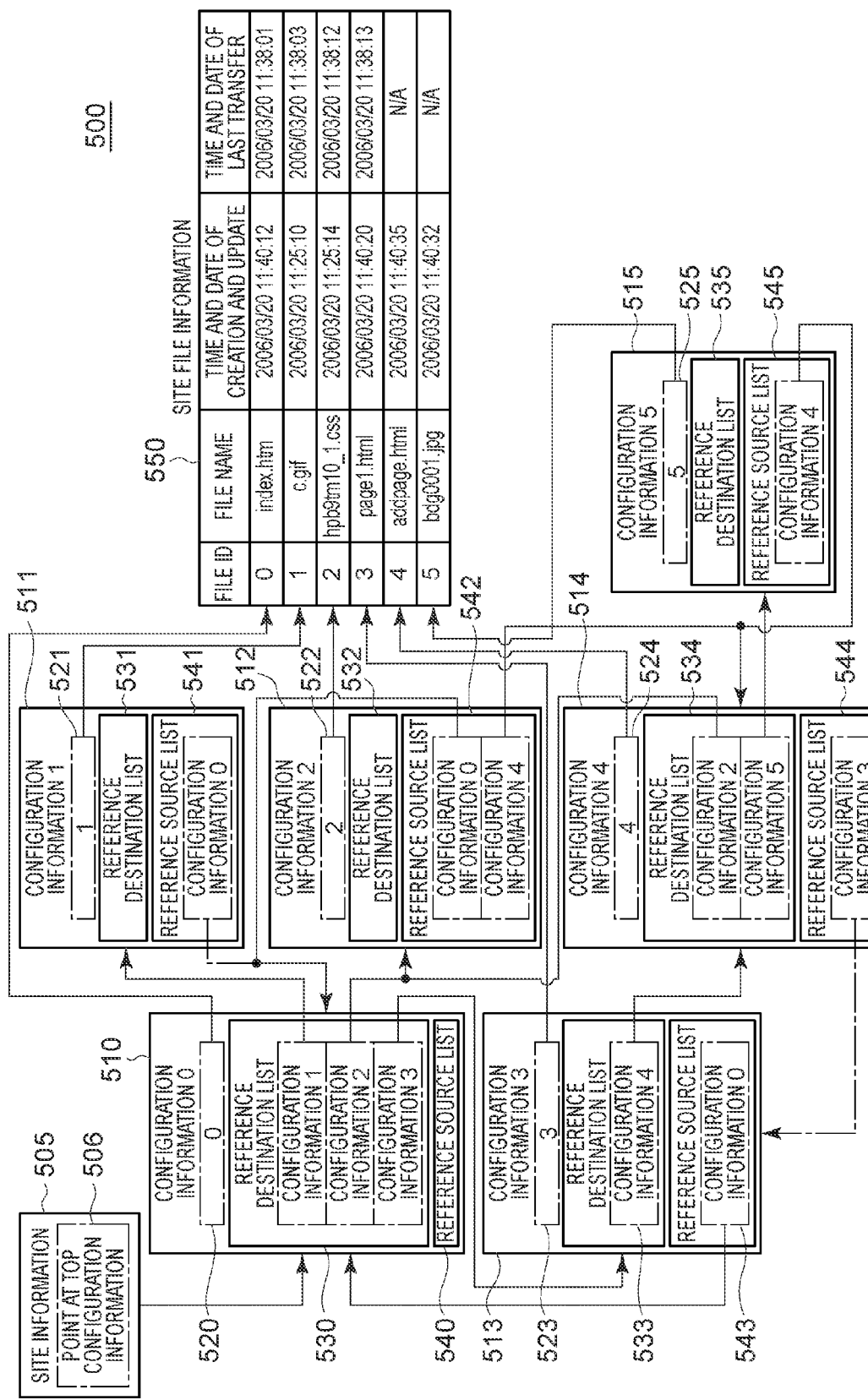
FIG. 5 is a schematic diagram illustrating a data management structure of a site file control mechanism 500.

FIG. 5 schematically illustrates, as the site file management mechanism 500, a data management structure on the basis of the data for representing the reference relation between respective configuration files. In an example shown in FIG. 5, the web contents of the website is composed of six files. The website is identified by site information data 505. Top configuration information point data 506 in the site information data 505 points at configuration information of a site top.

The six configuration files are managed by file management data 510 through 515 on pieces of configuration information 0 through 5 associated from the top configuration information point data 506. ID numbers 0 through 5 are given to the pieces of configuration information 0 through 5 as the file identification data 520 through 525, respectively. Corresponding file IDs in the site file information table 550 are pointed by the ID numbers 0 through 5, respectively. The site file information table 550 has each data of a file name, a time and date of creation change, and a time and date of last transfer on the configuration file identified by each file ID. In particular, file format data is obtained from file name data by an extension thereof.

The reference relation between the six configuration files is represented and managed by the configuration information of reference destination lists provided in the pieces of reference destination data 530 through 535 and by the configuration information of reference source lists provided in the pieces of reference source data 540 through 545. For example, the reference relation between the files managed as the configuration information 3 of the file management data 513 is indicated as follows. Namely, it is indicated to refer to a file managed as the configuration information 4 based on the configuration information 4 of the reference destination list in the reference destination data 533, and it is indicated to be referred to from a file managed as the configuration information 0 based on the configuration information 0 of the reference source list in the reference source data 543.

Thus, the information on the reference relation between the files composing the web contents is given by the reference relation data on the files, such as the reference destination data 530 through 535 and the reference source data 540 through 545. Usually, the reference relation data is provided by a reference function tag provided in the computer program. The reference function tag includes <a>, <area>, <link>, <img>, <input>, <frame>, <iframe>, <script>, or the like.

Figure 6:
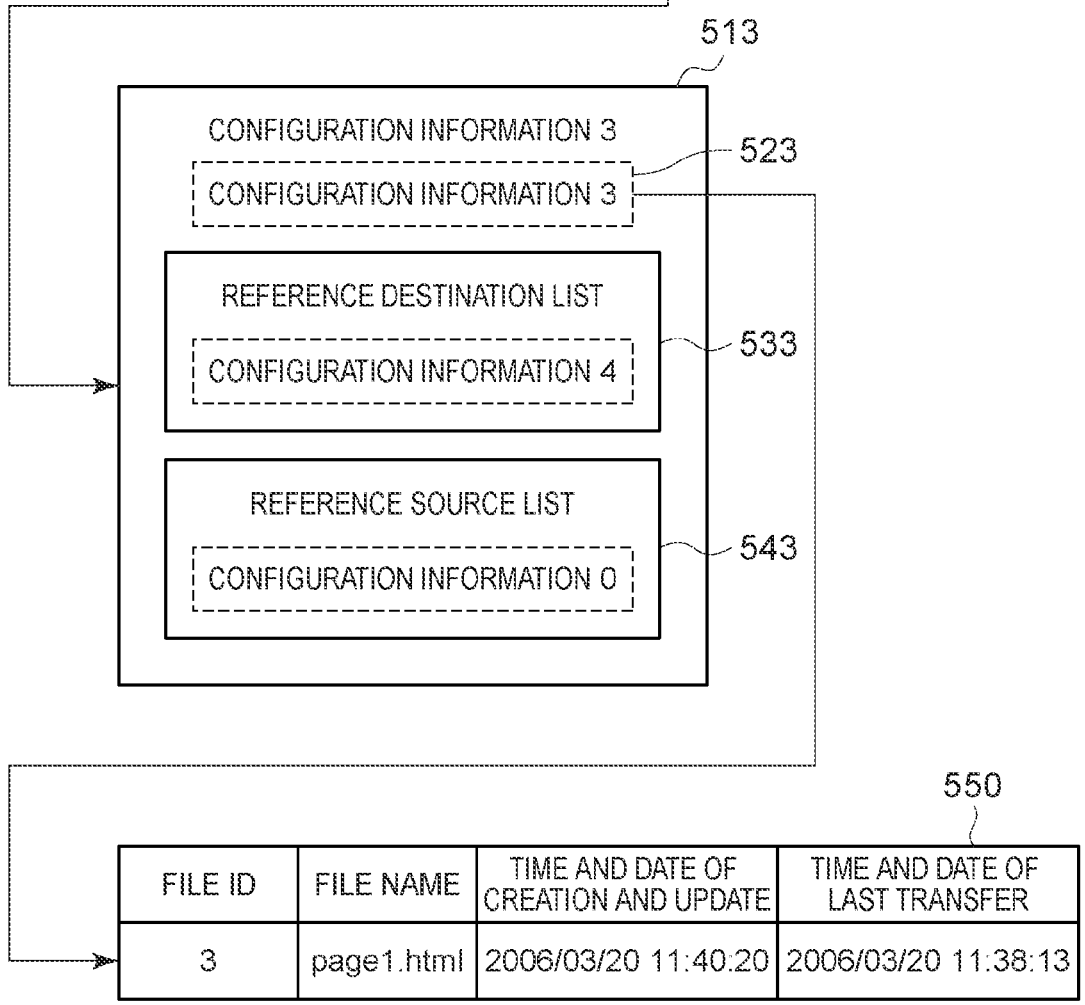
FIG. 6 is a view illustrating a site configuration file list table 600.

In implementation of the present invention, when the plurality of files composing the web contents are stored in the storage unit of the computer, the site configuration file list table may be created. As for the configuration files managed by the site file management mechanism 500 shown in FIG. 5 as the pieces of configuration information 0 through 5, a site configuration file list table 600 as shown in FIG. 6 will be created. The file management data 510 through 515 on the pieces of configuration information 0 through 5 are included in this table 600. As for the configuration files managed by the configuration information 0 through 5, the following data is provided by this table 600. Namely, since the file identification data 520 through 525 of the file management data 510 through 515 are pointing at corresponding file IDs in the site file information table 550 shown in FIG. 5, respectively, each data of the file name, the time and date of creation change, and the time and date of last transfer on the configuration files is provided. In addition, as shown previously, the reference relation information between the configuration files is also provided by the reference destination data 530 through 535 and the reference source data 540 through 545 of the file management data 510 through 515.

Returning to FIG. 4, following Step 410, the CPU 201 which is a processor of the computer 110 detects a file to be transferred, particularly detects a new creation file which is newly created or an updated file which is changed, from the plurality of files stored in the HDD 203, and creates a transfer file list table for the files to be transferred (415). Detecting the files to be transferred from the plurality of files can be implemented by detecting files created after last file transfer. For example, it is implemented by determining whether or not the time and date of creation on each of the plurality of files is after the time and date of the previous file transfer.

Figure 7:
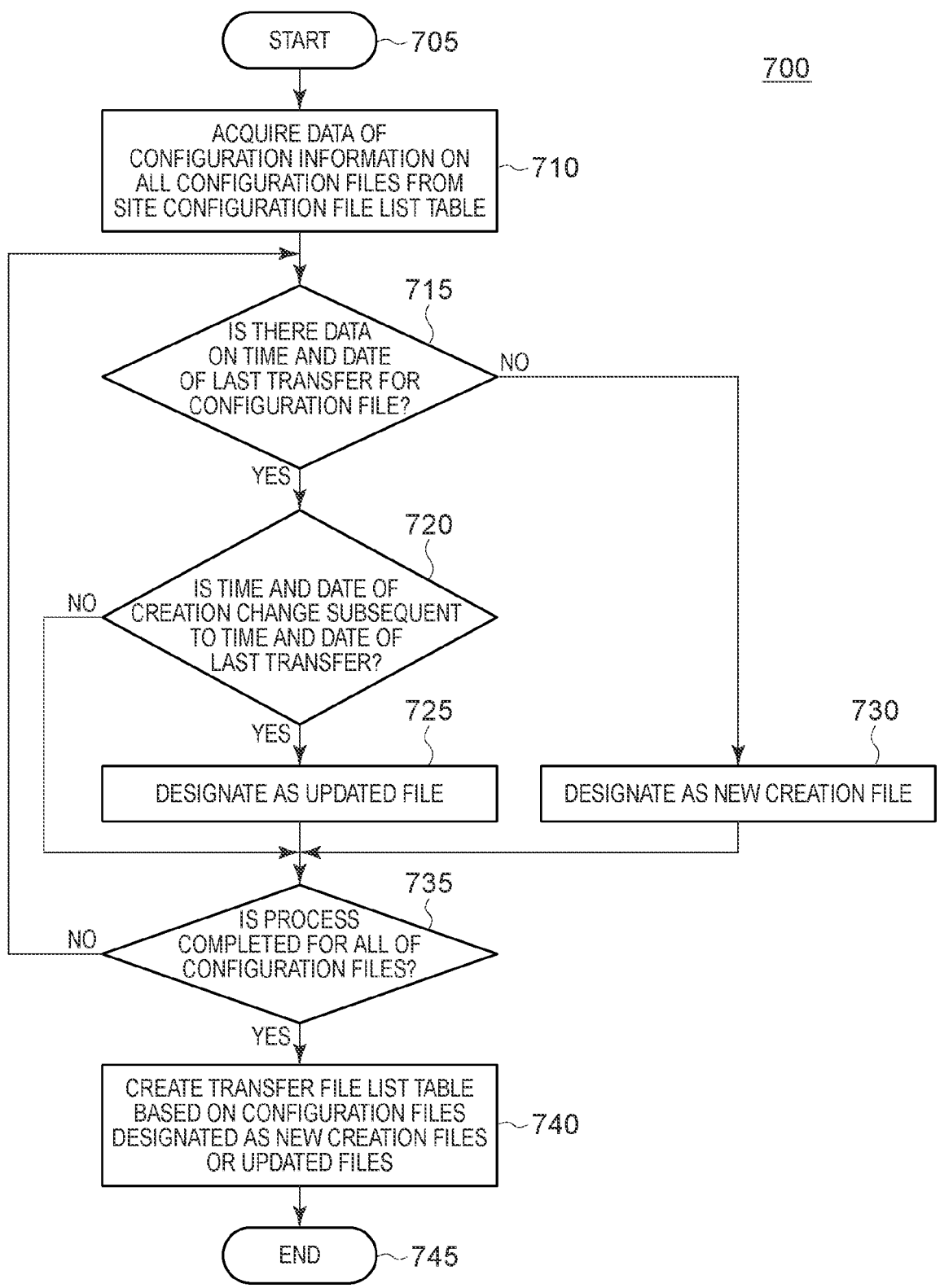
FIG. 7 is a view illustrating a process performed by a CPU 201 in order to create a transfer file list table.

FIG. 7 illustrates a flow chart 700 of the process performed by the CPU 201 for the implementation. The process starts at Step 705. First, the CPU 201 accesses the site configuration file list table 600 shown in FIG. 6, and acquires the data of the pieces of configuration information 0 through 5 on all of the configuration files (710).

Next, the CPU 201 checks, regarding respective configuration files, the file management data 510 through 515 of the corresponding pieces of configuration information, respectively, and determines whether or not there is data of the time and date of last transfer, among the time and date of creation change and the time and date of last transfer on respective configuration files in the site file information table 550 shown in FIG. 5 associated with the file identification data 520 through 525, respectively (715). In the example shown in FIG. 5, although there are the data of the time and date of last transfers in the configuration files managed by the pieces of configuration information 0 through 3, there in no data of the time and date of last transfers in the configuration files managed by the pieces of configuration information 4 and 5.

If there are the data of the time and date of last transfers like the configuration files managed by the pieces of configuration information 0 through 3, the CPU 201 performs comparison operation processing of both of the data of the time and date of creation changes and the time and date of last transfers on the configuration files, and determines whether or not the time and date of creation change is after the time and date of last transfer (720). If the time and date of creation change is after the time and date of last transfer like the configuration files managed by the configuration information 0 and 3, those configuration files are specified to the updated file (725). Meanwhile, if it is determined that there is no data of the time and date of last transfer in the configuration file at Step 715 like the configuration files managed by the pieces of configuration information 4 and 5, those configuration files are specified to the new creation files (730).

Next, the CPU 201 monitors whether or not the process for detecting the files to be transferred on all of the configuration files is completed (735). If it is not completed, the process returns to Step 715 and is continued until it is completed.

After the process is completed on all of the configuration files, the CPU 201 creates the transfer file list table for the files to be transferred from the configuration files specified to the updated files and the new creation files at Steps 725 and 730, respectively, namely, the configuration files managed by the pieces of configuration information 0, 3, 4, and 5 (740). In the example shown in FIG. 5, the file management data 510, 513, 514, and 515 on the pieces of configuration information 0, 3, 4, and 5 are included in a transfer file list table 800 as shown in FIG. 8 similar to the site configuration file list table 600 shown in FIG. 6. When the transfer file list table is created at Step 740, the process is completed (745).

Returning to FIG. 4 again, the CPU 201 subsequently determines the transfer priority of the files to be transferred on the basis of the reference relation data of the file to be transferred specified by the transfer file list table and the file format data of the web contents configuration files, and creates the transfer priority list table on the files to be transferred (420). It is possible to implement the determination of the transfer priority on the basis of the reference relation data and the file format data, and the creation of the transfer priority list table as follows.

FIG. 9 illustrates a flow chart 900 of the process executed by the CPU 201 for the implementation. The process starts at Step 905. First, the CPU 201 accesses the transfer file list table 800 created, for example at Step 415, and the site configuration file list table 600 shown in FIG. 6, respectively, and acquires the reference relation data of the files to be transferred and the file format data of the site configuration files from the tables 800 and 600, respectively (910). Particularly, the file format data is acquired from the corresponding file name data in the site file information table 550 pointed from file identification data 520, 523, 524, and 525 in the file management data 510, 513, 514, and 515 on the configuration information 0, 3, 4, and 5, and the reference relation data are also acquired from the reference destination data 530, 533, 534, and 535 and the reference source data 540, 543, 544, and 545. Particularly, it is possible to acquire the file format data from the extension of file name data.

Next, the CPU 201 determines the transfer priority on each of the files to be transferred according to the check shown below on the basis of the reference relation data and the file format data to thereby create the transfer priority list table. First, it is determined whether or not the files to be transferred are first classification files which are only referred to and taken into other files on the basis of the file format data (915). The file format data is checked in this determination.

Figure 10:
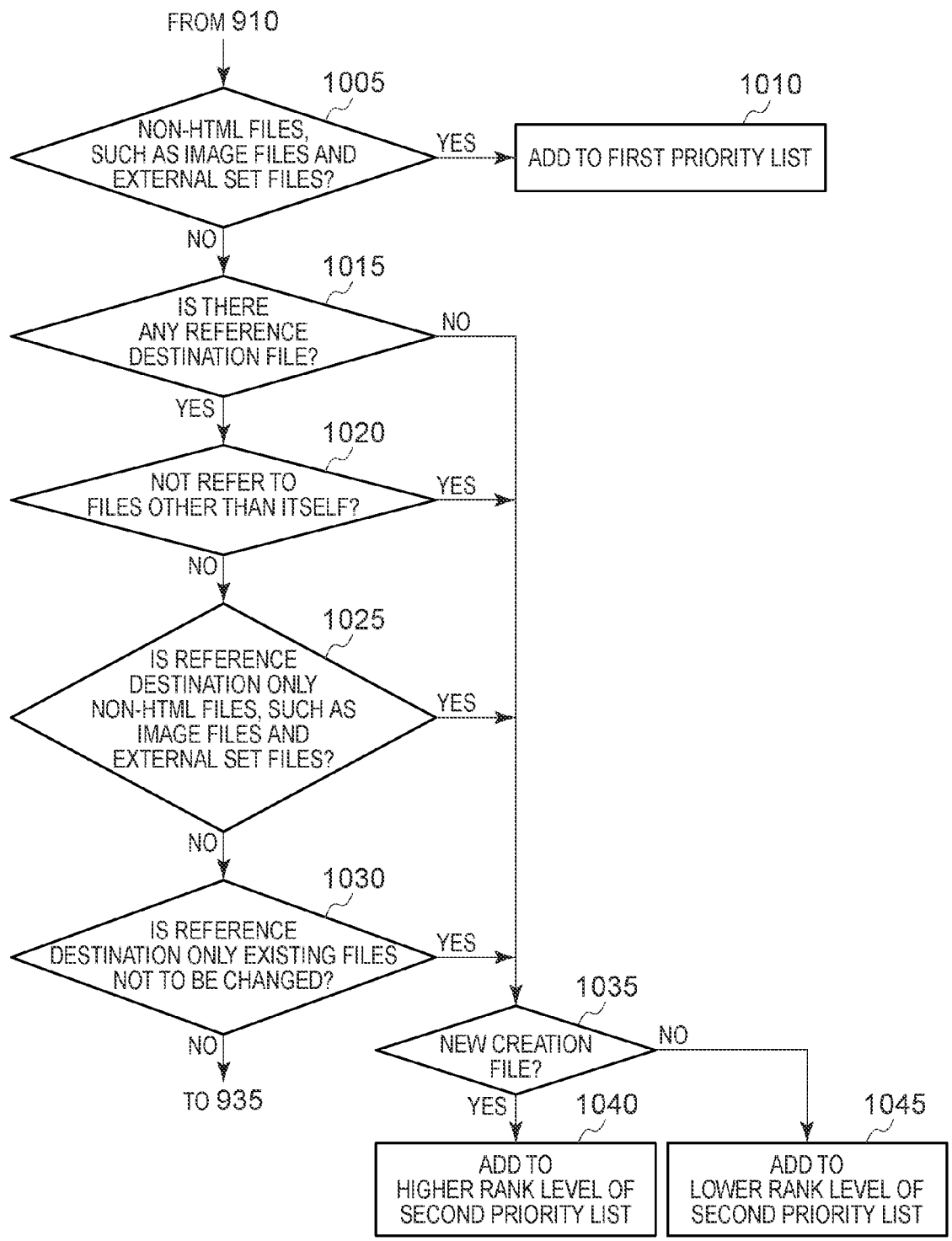
FIG. 10 is a view illustrating a process performed by the CPU 201 in order to create first and second priority list tables.

As shown in FIG. 10, in order to check whether or not the files are those which are only taken into other files but do not refer to other files, such as, for example an image file, and an external configuration file of an RSS file and an XML file, namely, the file other than an HTML file (non-HTML file), the extension of the file format data, namely, the file name data is compared with a file format reference thereof to be determined (1005). The files to be transferred are determined to be the first classification files when they corresponds to those files, and added to the first priority list (1010). Since the configuration file managed by the configuration information 5 has an extension jpg in the example shown in FIG. 5, the data of the configuration information 5 is added to the first priority list to compose the first priority list table. In this way, the first priority list table is created as shown in FIG. 9 (920).

If is the files are not determined to be the first classification files at Step 915, the CPU 201 determines, regarding the files to be transferred which are not determined to be the first classification files, whether or not the files are second classification files which do not refer to a file, which do not refer to a file other than itself even when it refers to a file, or which refers to only a first classification file or an existing not-changed file, on the basis of the reference relation data and the file format data (925). In this determination, the reference destination data which is the reference relation data is checked with reference to the file format data. Particularly, on the reference destination data, it is checked whether or not the file of a reference destination is set; if it is set, it is checked whether or not it refers to the file other than itself; if it refers to, it is checked whether or not the file to be referred to is the first classification file specified by the file format; and if it is not the first classification file, it is checked whether or not it is only the existing not-changed file.

First, as shown in FIG. 10, the CPU 201 determines whether or not the files of the reference destinations are set and are present in the reference destination list of the reference destination data 530, 533, and 534 of the pieces of configuration information 0, 3, and 4 which are not determined to be the first classification files (1015). If there are the files of the reference destination like the configuration files managed by the configuration information, the CPU 201 determines whether there is not any file other than itself in the file of the reference destination set to the reference destination lists, namely, whether the file other than itself is not referred to (1020). As the example of referring to its own file, there is a file using, for example a function that the <a> tag of the reference function tag has, namely, a function to jump to a specific location within the same web page. Many sentences or the like are described in the one file, and it is made to jump from the beginning portion of the web page to the middle portion of the web page using this function. In particular, a table of contents is created at the beginning portion of the web page, and clicking a predetermined portion of the table of contents executes a function to jump to a corresponding target portion in the middle of the web page.

Since there is the file other than itself in the file of the reference destination and the configuration files managed by those configuration information refer to the file other than itself, the CPU 201 then determines whether or not those files of the reference destination are only the files with the same file format as those checked at Step 1005 (1025). This determination is made in a manner similar to that checked at Step 1005. First, the file of the reference destination is specified. The site configuration file other than the file to be transferred can be included as the file of the reference destination. Hence, as for the file of the reference destination, only the transfer file list table 800 is not enough to check the file format data thereof, so that the site configuration file list table 600 shown in FIG. 6 is used. As shown in FIG. 5, the configuration files managed by the configuration information 0 and 4 among the configuration files managed by the configuration information use the configuration files managed by the configuration information 1 or 2 other than the files to be transferred which are the configuration information 0, and 3, 4 and 5 as the reference destination. For that reason, the CPU 201 accesses the site configuration file list table 600, and reads and uses the file format data from the file name data of the configuration file managed by the configuration information 1 or 2.

The file of the reference destination which is only the first classification file having a specific file format at Step 1025 is only the configuration file managed by the configuration information 4 among the configuration files managed by those configuration information. Only the configuration file managed by the configuration information 4 is the configuration file, in which only the configuration files which are managed by the pieces of configuration information 2 and 5, and have extensions css and jpg, respectively, are set as the file of the reference destination. A second priority is set to the configuration file managed by the configuration information 4.

If the determination result at Step 1025 is denial, it is further determined whether or not the file of the reference destination is only the existing file which is not changed (1030). In this determination, the CPU 201 checks whether or not the file set as the reference destination in the configuration information is the file set in the transfer file list table. As the result of the check, if it is detected that only the file which is not set in the transfer file list table is set as the file of the reference destination, since the file of the reference destination is only the existing file which is not changed, the second priority is set to the file to be transferred managed by the configuration information. As for the configuration information 0 and 3 which are left by the determination so far, the configuration files according to the configuration information 3 and 4 set in the transfer file list table 800 shown in FIG. 8 are set to both of them as the file of the reference destination, respectively. As a result, since the file of the reference destination is not only the existing file which is not changed on the pieces of configuration information 0 and 3, the second priority as well as a first priority is not set to the files to be transferred managed by the pieces of configuration information 0 and 3. After all, those files to be transferred will be processed at Step 935 shown in FIG. 9.

Incidentally, regarding the file to be transferred which are determined not to correspond to the first classification file by the determination at Step 1005, if it is determined that there is no file of the reference destination by the determination at Step 1015; if it is determined not to refer to the file other than itself by the determination at Step 1020; if it is determined that the file of the reference destination is only the file corresponding to the first classification file by the determination at Step 1025; and if it is determined that the file of the reference destination is only the existing file which is not changed by the determination at Step 1030, it is determined whether or not the file determined at each step is the new creation file (1035).

In the determination at Step 1035, the CPU 201 accesses the transfer file list table 800 shown in FIG. 8 to check whether the configuration file managed by the configuration information of a determination target file is specified to the new creation file according to the procedure shown in FIG. 7. If it is specified to the new creation file, the determination target file is then determined to be the new creation file and is added to a higher rank level of the second priority list (1040). Since the new creation file is a newly created configuration file and is a file which is not present in the web server yet whereas the updated file is obtained by changing the configuration file already presented in the web server, the process of giving priority to the new creation file over the updated file is performed. Meanwhile, if it is specified to the updated file but is not specified to the new creation file, the determination target file is not determined to be the new creation file, namely, it is added to the lower ranking level of the second priority list as the updated file (1045). In any cases, the configuration information of the determination target file is added to the higher rank level or the lower ranking level of the second priority list to constitute the second priority list table. In this way, the second priority list table is created as shown in FIG. 9 (930). In the example shown in FIG. 5, while the second priority is set to the configuration file managed by the configuration information 4, the configuration file managed by the configuration information 4 is specified to the new creation file. As a result, the configuration file managed by the configuration information 4 is given higher priority over the updated file in the second priority as the new creation file, and is set at the higher rank level.

Now, the CPU 201 determines the files to be transferred which have not been determined to be the second classification files by the determination at Step 925 shown in FIG. 9 to be third classification files which are not classified into the first classification and second classification files, and creates the third priority list table for the files to be transferred (935). As described previously, since neither the first priority nor the second priority is set to the files to be transferred managed by the pieces of configuration information 0 and 3, the third priority is set to those files to be transferred, and the third priority list table is created.

After Step 935, the CPU 201 monitors whether or not the process of determining the transfer priority and creating the list table is completed on all of the files to be transferred specified in the transfer file list table (940). If it is not completed, the process returns to Step 915 and is continued until it is completed. If it is completed, the process is completed (945).

FIG. 11 illustrates an example of the transfer priority list table for the files to be transferred. Respective tables of the first through the third priority lists created when the process of determining the transfer priority and creating the list table is completed on all of the files to be transferred are shown. The file management data of the configuration information 5 is set in the first priority list table 1110. The file management data of the configuration information 4 is set in the second priority list table 1120 at the higher rank level thereof. The file management data of the pieces of configuration information 0 and 3 are set in the third priority list table 1130. The transfer priority list table is composed in a manner similar to the site configuration file list table 600 shown in FIG. 6, and the transfer file list table 800 shown in FIG. 8.

Returning to FIG. 4 again, when the transfer priority list table is created, the files to be transferred are transferred from the communication adapter 206 which is the communication controller of the computer to the web server 120 through the network by the CPU 201 in order of the transfer priority set in the transfer priority list table thereof (425). For example, the CPU 201 accesses the transfer priority list table, reads the files to be transferred, which are set in the table, from the HDD 203 in order of the transfer priority, and transfers them from the communication adapter 206 to the web server 120 through the network. Hereinafter, the process at Step 425 by the CPU 201 will be described in more detail.

First, the CPU 201 accesses the first priority list table 1110 shown in FIG. 11, which forms a part of the transfer priority list table, reads the configuration file of the configuration information 5 set as the first priority in the table 1110 from the HDD 203, and transfers it from the communication adapter 206 to the web server 120 through the network. The data of the time and date of last transfer on the configuration file of the configuration information 5 is then recorded on the site file information table 550 shown in FIG. 5. Similarly, the CPU 201 reads and transfers the configuration file of the configuration information 4 set at the higher rank level of the second priority list in the second priority list table 1120 shown in FIG. 11. If the data of the configuration information is set also at the lower ranking level of the second priority list in the second priority list table 1120, the configuration file according to the configuration information is also read and transferred. The data of the time and date of last transfer on the configuration file of the configuration information 4 is then recorded on the site file information table 550. FIG. 12 illustrates the site file information table 550 after sequentially transferring the new creation files of the configuration information 5 and 4 set to the first priority and the second priority, respectively. The data of the time and date of last transfer is already recorded on the table 550 to the configuration files of the pieces of configuration information 4 and 5.

Next, the CPU 201 reads and transfers the configuration files of the pieces of configuration information 0 and 3 set at the third priority list in the third priority list table 1130 shown in FIG. 11. If there are a plurality of configuration files managed by the configuration information set at the third priority list in this transfer, the order of transferring the plurality of configuration files must also be taken care of so as not to lose the reference relation between the plurality of configuration files. Incidentally, even when there are a plurality of configuration files managed by the configuration information set at the first priority list, there is no cross-reference relation among the configuration files. Additionally, even when there are a plurality of configuration files managed by the configuration information set at the second priority list, since the configuration file which is set at the first priority list and is transferred previously, and the configuration file which is already present in the web server are only included in the reference relation between the configuration files, the reference relation between the plurality of configuration files is not lost by the timing of transferring them.

Figure 13:
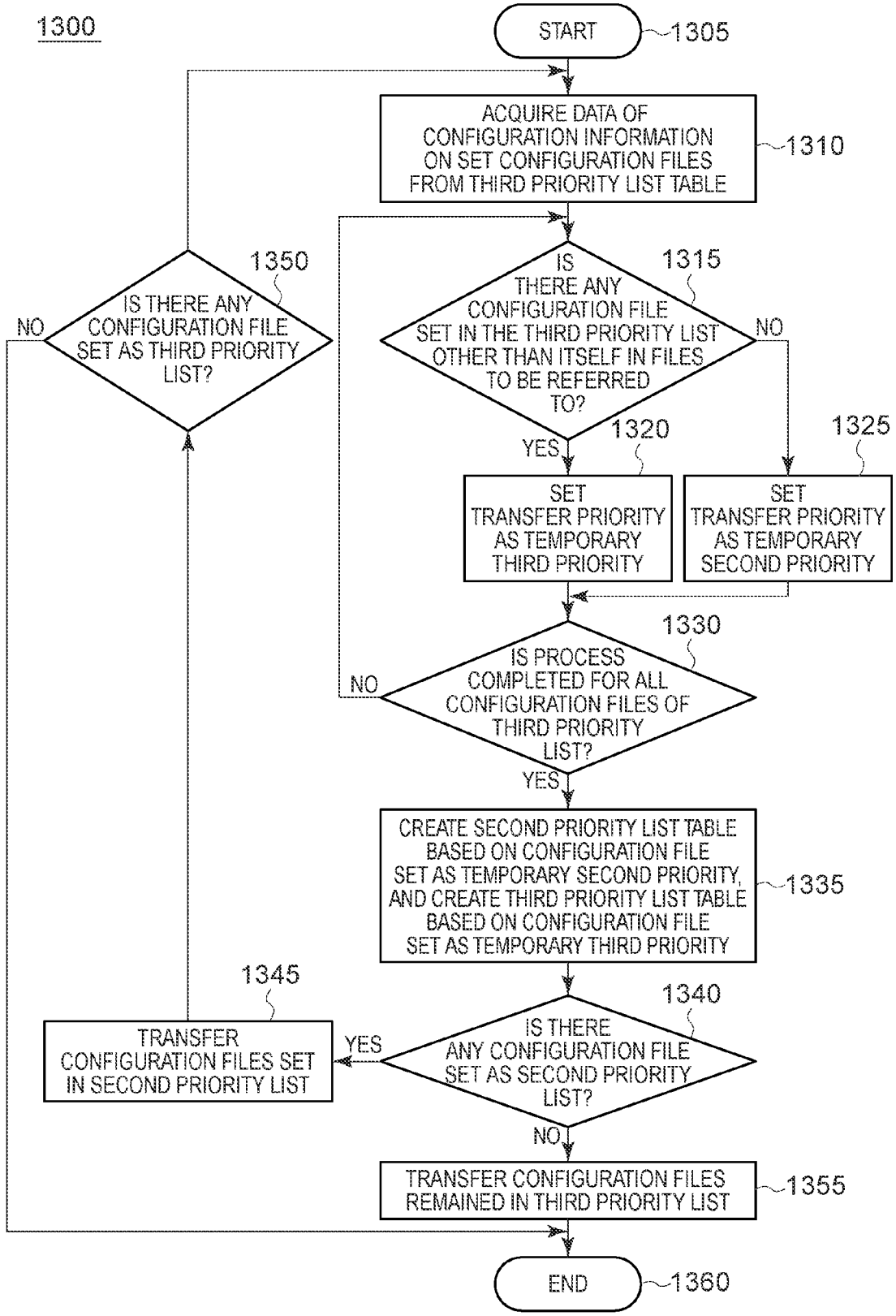
FIG. 13 is a view illustrating a dynamic change processing of a third priority according to the CPU 201.

FIG. 13 illustrates a flow chart 1300 of the dynamic change processing of the third priority by the CPU 201. The process starts at Step 1305. The CPU 201 first acquires the data of the configuration information on the configuration files set in the third priority list table (1310). The CPU 201 accesses the third priority list table 1130 shown in FIG. 11 to acquire the data of the pieces of configuration information 0 and 3 on the configuration files being set therein.

Next, the CPU 201 checks, regarding the files to be transferred which are set in the third priority list table, the reference relation data according to the configuration information of the files, namely the reference destination data, and determines whether or not one file to be transferred which is set in the third priority list table refers to another file other than itself to be transferred which is set in the third priority list table (1315). Since the CPU 201 has acquired the data of the pieces of configuration information 0 and 3 for the configuration files set in the third priority list table 1130 at Step 1310, the another file referred to from the reference destination data according to the pieces of configuration information 0 and 3 will be detected. Hence, the CPU 201 may check whether or not there is another file set in the third priority list table, which is referred to by the one file.

As for the configuration files according to the pieces of configuration information 0 and 3, the files to which the configuration file according to the configuration information 0 refers are the configuration files according to the pieces of configuration information 1, 2, and 3 based on the reference destination data of the configuration information 0, particularly the reference destination data 530 shown in FIG. 5, and there is the configuration file according to the configuration information 3 set in the third priority list table other than itself in the file to be referred to. Hence, the configuration file according to the configuration information 0 satisfies a determination condition at Step 1315. Meanwhile, the file to which the configuration file according to the configuration information 3 refers is only the configuration file according to the configuration information 4 based on the reference destination data of the configuration information 3, particularly the reference destination data 533 shown in FIG. 5, and there is no configuration file set in the third priority list table other than itself in the file to be referred to. Hence, the configuration file according to the configuration information 3 does not satisfy the determination condition at Step 1315.

If there is the configuration file set in the third priority list table other than itself in the file to be referred to in the determination at Step 1315, the CPU 201 sets the transfer priority of the configuration file as a temporary third priority (1320). Meanwhile, if there is no configuration file set in the third priority list table other than itself in the file to be referred to, the CPU 201 sets the transfer priority of the configuration file as a temporary second priority (1325). The configuration file according to the configuration information 3 does not refer to the configuration file set in the third priority list table, and the reference relation is not lost, so that it is possible to transfer it prior to the configuration file according to the configuration information 0 similarly set. Hence, the transfer priority of the configuration file according to the configuration information 3 is set as the temporary second priority. However, the configuration file according to the configuration information 0 refers to the configuration file set in the third priority list table, and thus there is a fear that the reference relation might be in trouble. Hence, the transfer priority of the configuration file according to the configuration information 0 is set as the temporary third priority. As is understood, the transfer order of the configuration files according to the pieces of configuration information 0 and 3 set in the third priority list table 1130 is dynamically changed.

After setting of the temporary second priority and the temporary third priority, the CPU 201 monitors whether or not the dynamic change processing of the third priority is completed on all of the configuration files set in the third priority list table (1330). If it is not completed, the process returns to Step 1315 and is continued until it is completed.

If the dynamic change processing of the third priority is completed on all of the configuration files set in the third priority list table, the CPU 201, while re-creating the second priority list table by the configuration file whose transfer priority is set as the temporary second priority, re-creates the third priority list table by the configuration file whose transfer priority is set as the temporary third priority (1335). Since the transfer priority of the configuration file according to the configuration information 3 is set as the temporary second priority, the second priority list table is re-created on the configuration file according to the configuration information 3. Moreover, since the transfer priority of the configuration file according to the configuration information 0 is set as the temporary third priority, the third priority list table is re-created on the configuration file according to the configuration information 0.

After re-creating the second and third priority list tables at Step 1335, the CPU 201 checks whether or not there is any configuration file reset in the second priority list table (1340). If there is, such a configuration file is transferred (1345). The CPU 201 accesses the re-created second priority list table, reads the configuration file of the configuration information 3 reset as the second priority in the table from the HDD 203, and transfers it from the communication adapter 206 to the web server 120 through the network. The data of the time and date of last transfer on the configuration file of the configuration information 3 is then recorded on the site file information table 550 shown in FIG. 5.

After transferring the configuration file set in the second priority list table, the CPU 201 determines whether or not there is any configuration file set in the re-created third priority list table (1350). If there is such a configuration file therein, the step returns to Step 1310 and the process is continued. If there is no such a configuration file, the dynamic change processing of the third priority is not necessary any longer, so that the process proceeds to Step 1360 and will be completed.

Since the configuration file according to the configuration information 0 is set in the third priority list table, the CPU 201 similarly performs the process. Namely, the data of the configuration information 0 on the configuration file is acquired at Step 1310. At Step 1315, it is determined, on the configuration file according to the configuration information 0, whether or not there is any file to be transferred which is set in the third priority list table other than itself in the file to be referred to. The files to which the configuration file according to the configuration information 0 refers are the configuration files according to the pieces of configuration information 1, 2, and 3 based on the reference destination data of the configuration information 0, particularly the reference destination data 530 shown in FIG. 5 as it is also shown previously. Since the configuration file according to the configuration information 3 examined in the previous process has been reset as the second priority, it is not the configuration file set in the third priority list table any longer. Namely, there is no configuration file set in the third priority list table other than itself in the file to be referred to. Hence, the configuration file according to the configuration information 0 does not satisfy the determination condition at Step 1315, so that the transfer priority of the configuration file is set as the temporary second priority at Step 1325. Thereafter, the second priority list table is re-created on the configuration file according to the configuration information 0 at Step 1335 through Step 1330, the presence of the configuration file reset in the second priority list table at Step 1340 is confirmed, and the configuration file according to the configuration information 0 is transferred at Step 1345. After the transfer, the data of the time and date of last transfer on the configuration file of the configuration information 0 is recorded on the site file information table 550 shown in FIG. 5. Since there is no configuration file set in the re-created third priority list table any longer at Step 1350, the process proceeds to Step 1360 and will be completed.

Incidentally, in this example, there is no configuration file any more set in the third priority list table re-created when the second priority list table is re-created on the configuration file according to the configuration information 0. Namely, before there is no configuration file reset in the second priority list table any more, there has been no configuration file set in the third priority list table. However, it may occur that there is the configuration file still set in the third priority list table when there has been no configuration file reset in the second priority list table. In that case, the CPU 201 transfers the configuration file which remains while being still set in the third priority list table through the check at Step 1340 (1355). The data of the time and date of last transfer on the remained configuration file is recorded upon transferring it. The process is then completed at Step 1360.

As is understood, by performing the dynamic change processing of the third priority in which the file that can be transferred first is found and transferred without losing the reference relation, to the configuration file set as the third priority, it is also possible to improve the order of transferring the configuration files set in the third priority.

As mentioned above, while one embodiment of the method according to the present invention for transferring the web contents to the web server has been described along with the processing operation of the CPU 201, the CPU 201 achieves a following software module configuration when the computer program according to the present invention for achieving the method by the computer is installed in the computer. It is possible to achieve the software module configuration by a hardware configuration due to micro-coding the module or the like.

Figure 14:
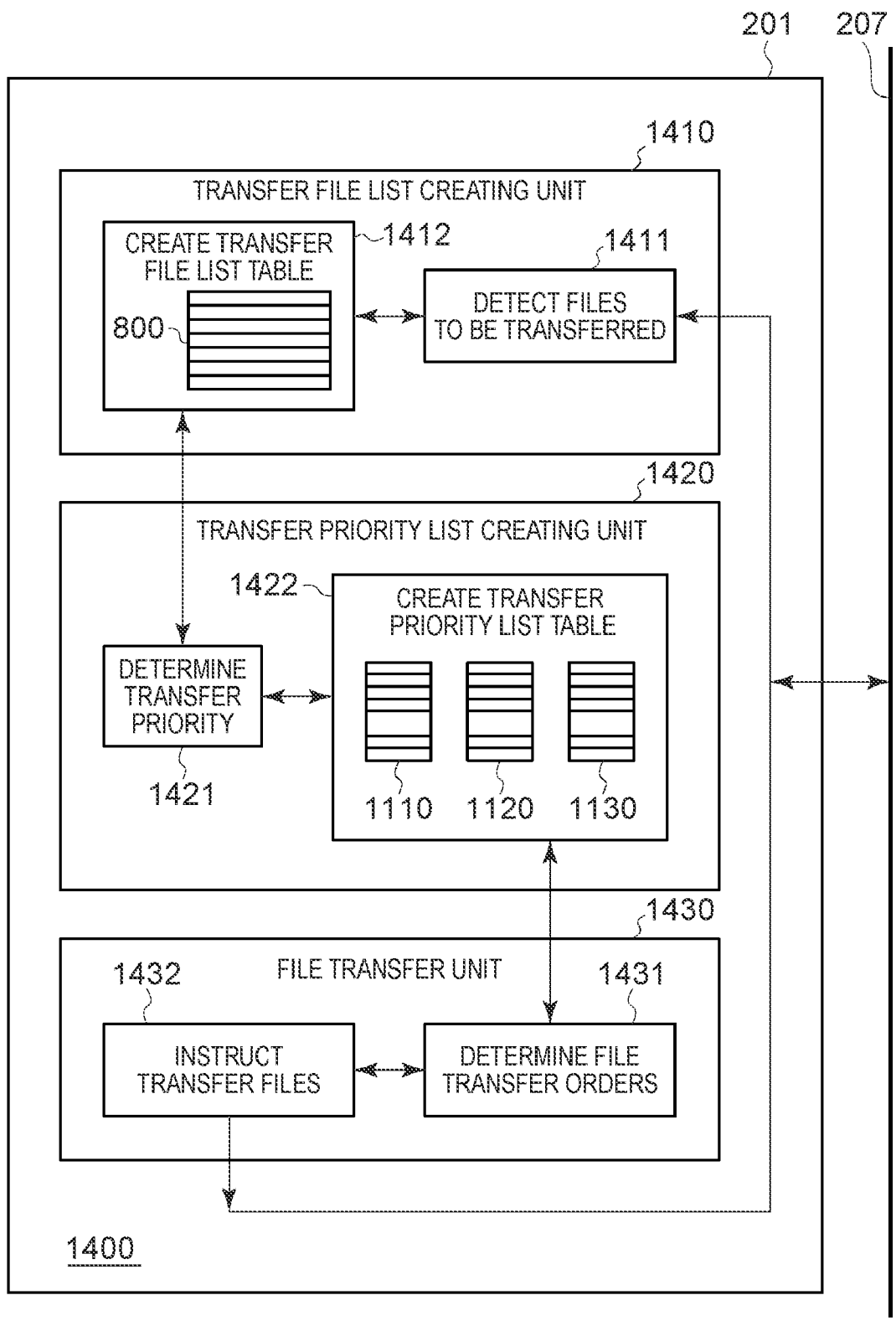
FIG. 14 is a view illustrating a configuration of the CPU 201 when a program is installed.

FIG. 14 illustrates a configuration 1400 of the CPU 201 at that time. First, there is achieved a transfer file list creating unit 1410 for detecting the file to be transferred from a plurality of files stored in the HDD 203 through the bus 207 by a file to be transferred detection executing section 1411, to thereby create the transfer file list table 800 on the file to be transferred by the transfer file list table creation executing section 1412. In addition, there is achieved a transfer priority list creating unit 1420 for determining the transfer priority of the files to be transferred by a transfer priority determination execution section 1421 on the basis of the reference relation data of the file to be transferred which is specified in the transfer file list table 800 in the transfer file list table creation executing section 1412, and the file format data of the plurality of files, to thereby create the transfer priority list tables 1110, 1120, and 1130 for the files to be transferred by a transfer priority list table creation executing section 1422.

Further, there is achieved a file transfer unit 1430 for instructing the file to transfer from a file transfer order determination executing section 1431 to the HDD 203 through a transfer file instructions executing section 1432 in order of the transfer priority set in the transfer priority list tables 1110, 1120, and 1130 in the transfer priority list table creation executing section 1422, and transferring the instructed files to be transferred from the communication adapter 206 to the web server 120 through the network.

While the present invention has been described using the embodiments, the technical scope of the present invention is not limited to that of the above-described embodiments. It is possible to add various changes or improvements to the above-mentioned embodiment. Naturally, the mode to which such a modification or improvement is added is also included in the technical scope of the present invention.

What is claimed is:

1. A method of transferring Web contents from a computer to a Web server via a network, including:

maintaining a plurality of files configuring the Web contents by a storage device of the computer;

detecting files to be transferred from the plurality of files, and preparing a transfer file list table for the files to be transferred by a processor of the computer;

determining, based upon reference relationship data indicating a reference origin and a reference destination of the files to be transferred designated by the transfer file list table and file format data indicating types and formats of the plurality of files, a transfer priority order for the files to be transferred, and creating a table of a transfer priority order list for the files to be transferred; and determining that the files to be transferred are files of a first classification only to be referred to and imported by other files, and creating a table of a first priority list for the files to be transferred determined as files of the first classification;

determining that the files to be transferred are not determined as files of the first classification, based upon the reference relationship data and the file format data, are files of a second classification which does not refer to a file other than its own files, or refers to only files of the first classification and existing unmodified files, and creating a second priority order list table for the files to be transferred determined as files of the second classification; and determining the files to be transferred not determined as files of the first classification and of the second classification, as files of a third classification, and creating a third priority order list table for the files to be transferred; and, the transfer of the files to be transferred to the Web server in the transfer priority order set by the transfer priority order list table includes:

sequentially transferring the files to be transferred set by the first and second priority order list tables to the Web server in accordance with the transfer priority order contained therein;

for the files to be transferred set by the third priority order list, examining the reference relationship data of the files;

determining whether the files to be transferred set by the third priority order list refer to files other than its own files;

resetting the files to be transferred determined as not from the third priority order list table to the second priority order list table; and re-creating tables of the second and third priority order lists, respectively;

transferring the files to be transferred, which have been determined as not designated by the second priority order list table, to the Web server;

repeating the determination about whether or not the files exist, re-creation of the second and third priority order list tables and the transfer to the Web server until there is no file to be transferred determined as not existing; and in the case that the files to be transferred, which have been determined as existing and designated by the third priority list table, remain, transferring the remaining files to be transferred to the Web server; and outputting the files to be transferred on a display device.

2. The method according to claim 1, wherein the detection of the files to be transferred from the plurality of files includes detecting files created after a previous file transfer.

3. The method according to claim 2, wherein the detection of the files created after the previous file transfer also includes determining whether or not the creation date & time for the plurality of files is after the date & time for the previous file transfer according to the data of the creation date & time and the data of transfer date & time.

4. The method according to claim 1, wherein the determination of the transfer priority order for the files to be transferred based upon the reference relation data of the files to be transferred and the file format data of the plurality of files includes determining a transfer priority order for the files to be transferred based upon reference destination data to be referred to from the files to be transferred and file extensions of the plurality of files.

5. The method according to claim 1, wherein the determination of the transfer priority order for the files to be transferred includes prioritizing newly created files to modified files in the transfer priority order.

6. The method according to claim 1, including:

providing the reference relationship data by a reference function tag, and determining the files to be transferred, which have not been determined as files of the first classification, as files of the second classification or files of the third classification based upon the reference destination data set by the reference function tag.

7. The method according to claim 6, wherein the determination that files are of the second classification or are files of the third classification based upon the reference destination data set by the reference function tag includes:

detecting that only its own files are set in the reference destination data, and determining the files to be transferred, which have not been determined as files of first classification, as files of the second classification.

8. The method according to claim 6, wherein the determination that files are of the second classification or files of the third classification based upon the reference destination data set by the reference function tag includes:

examining the file format data about the files set in the reference destination data;

detecting only the files of the first classification set by the reference destination data; and determining that files to be transferred, which have not been determined as files of the first classification are files of the second classification.

9. The method according to claim 6, wherein
the determination that files are of the second classification or files of the third classification includes:
examining the transfer file list table with regard to the files set by the reference function tag;
detecting only files to be transferred, which have not been determined as files of the first classification, as files of the second classification; and
determining that files to be transferred, which have not been determined as files of the first classification, are files of the second classification.

10. The method according to claim 6, wherein the determination that only its own files are to be transferred as designated by the third priority list table includes
detecting that only its own files are to be transferred as set by the third priority order list table as set by the reference destination data.

11. The method according to claim 1, wherein
the plurality of files comprising the Web contents are created and updated by a second computer connected to the computer via a network, and
the plurality of files are received from the second computer and maintained in the storage device.

* * * * *